L. KINSLEY.
PISTON PACKING RING.
APPLICATION FILED DEC. 1, 1915.
1,224,751.
Patented May 1, 1917.
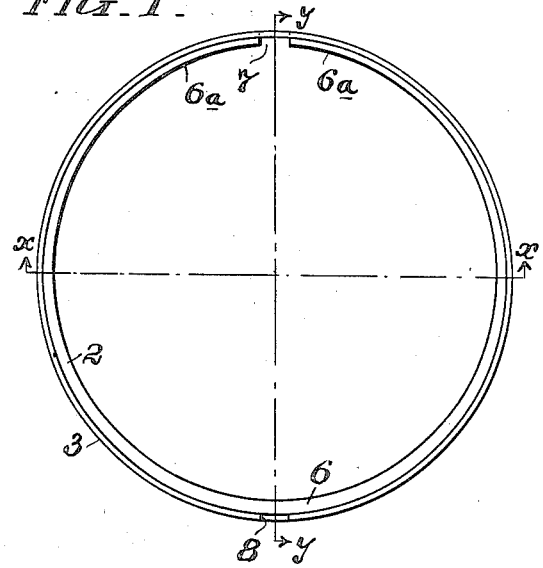
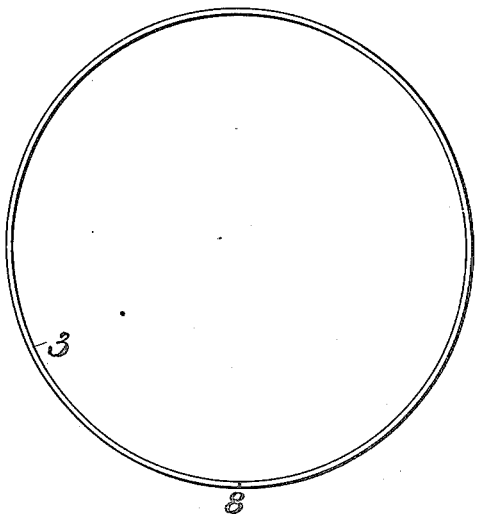
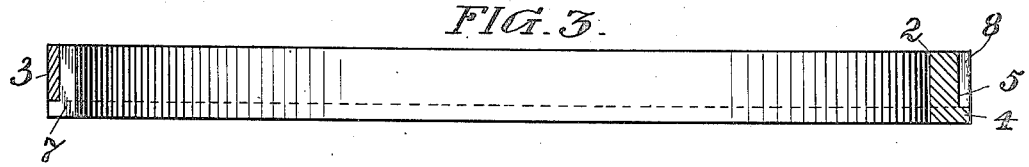
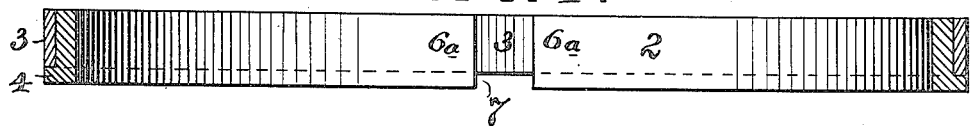
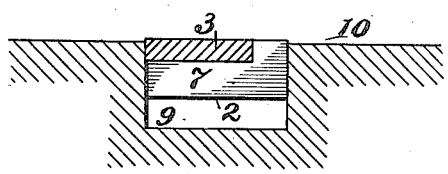
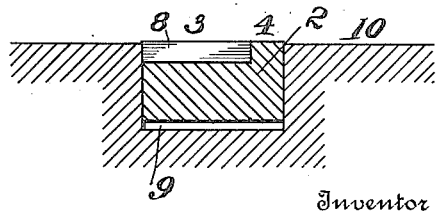
Witnesses
Daniel Webster Jr.
E. W. Smith.
Inventor
Lewis Kinsley
By
Attorney

UNITED STATES PATENT OFFICE.

LEWIS KINSLEY, OF PHILADELPHIA, PENNSYLVANIA, ASSIGNOR TO HOPE MACHINE COMPANY, A CORPORATION OF PENNSYLVANIA.

PISTON PACKING-RING.

1,224,751.  Specification of Letters Patent.  Patented May 1, 1917.

Application filed December 1, 1915. Serial No. 64,411.

*To all whom it may concern:*

Be it known that I, LEWIS KINSLEY, a citizen of the United States, and resident of Philadelphia, county of Philadelphia, and State of Pennsylvania, have invented an Improvement in Piston Packing-Rings, of which the following is a specification.

The object of my invention is to provide a suitable construction of piston packing ring which will insure a tight packing and at the same time compensate for wear in an automatic manner, the improvement being especially adapted for explosive engines and compressors where high compression is required.

My invention consists of a compound ring formed of two parts, an inner ring flanged at one end and of a general cross section tapering in thickness so that on diametrically opposite points it is thickest at one side and thinnest at the other, and a given part of the metal removed circumferentially from the thin portion whereby the ring is capable of being sprung inward to a smaller diameter, and a second or inclosing ring of uniform cross section and of great resiliency, said ring being split at one point in its circumference without material removal of any of the original metal, and expanded over and fitting a groove in the first mentioned ring, the split portions of the two rings being out of alinement, and the said rings having elasticity in opposed relation; that is to say, the first mentioned or tapered ring normally resisting compression and the outer or second mentioned ring resisting expansion and tending to compress the inner ring.

My invention also comprehends details of construction, which together with the features above specified, will be better understood by reference to the drawings, in which:—

Figure 1 is a plan view of one of my improved piston rings ready for application to a piston; Fig. 2 is a plan view of the outer ring thereof when unrestrained by the inner ring; Fig. 3 is a transverse sectional elevation of my improved piston ring on line $y$—$y$ of Fig. 1; Fig. 4 is a transverse sectional elevation of my improved piston ring on line $x$—$x$ of Fig. 1; and Figs. 5 and 6 are transverse sections of a portion of the piston with my improved piston ring in position, the section of the piston ring being taken on the dotted line portions $y$—$y$ of Fig. 1.

The inner ring 2 in its normal condition has a cross section somewhat L-shaped with the cylindrical flange 4 at one side. The circumference of the ring is turned up circular, as is also the inner part, but the latter is eccentric with respect to the circumferential surface of the outer part, so that the cross section of the ring is thicker at one side than at the diametrically opposite side and tapers from said thicker side gradually to the thinnest portion. At the thinner portion there is a section cut out to form the gap 7. The ring is therefore thickest at the part 6 diametrically opposite to the gap 7 and tapers gradually around to the free ends 6ᵃ forming the boundaries of the gap. The ring is preferably made of cast iron so as not to lose its resiliency under heat; and by reason of the tapered cross section, the two free ends 6ᵃ may be pressed toward each other and the general circumference and diameter of the ring reduced while maintaining a circular shape. The other ring 3 is of uniform cross section throughout and is relatively lighter than the inner ring. This ring has a circumferential diameter slightly less than what would be the actual diameter of the cylinder which it is to fit, and said ring is split at 8 at one place in its circumference and so that normally it will approximate a complete circle, in this respect differing from the ring 2 in which there is a large normal gap 7. The cross section of the ring 3 is rectangular and fits the rectangular recess 5 formed in the outer surface of the inner ring 2, and being of a width less than the width of the inner ring and so as just to fit from the inner face of the flange 4 to the opposite face of the ring 2, as will be clearly understood by reference to Fig. 4. When the ring 3 is expanded and placed over the recessed portion of the inner ring 2, the parts are as indicated in Fig. 1, in which it will be seen that the split 8 has been spread to approximate the extent of the gap 7 of the inner ring, these parts 7 and 8 being preferably arranged diametrically opposite, though this is not essential so long as the said parts 7 and 8 do not come into direct alinement. The outer ring 3 is held in expanded condition by the superior strength of the inner ring 2, and each of the rings bridges the gap in a radial direction in the other, except that portion which corresponds to the width of the flange 4, but in this case the ring 3 bridges the gap 7 of the flange 4 in a longitudinal direction.

When my improved ring is put upon a piston, it is in expanded condition and is easily sprung at 9 of the piston 10, and snugly fits the width of the groove. When the piston is pushed into the cylinder, the inner ring 2 is compressed so that the gap 7 is largely eliminated, and as the compression of the ring 2 takes place the resiliency of the ring 3 almost closes the gap formed at the split portion 8, and this contraction of the ring is positively insured by the cylinder walls. It will be noted that the main portion of the piston ring in contact with the cylinder will be the outer surface of the ring 3, and as this is normally turned (Fig. 2) to fit the cylinder, it is evident that a very accurate fit is insured from the very start, and no distortion of the ring is required to insure the fitting, a defect which is so fatal in many forms of packing rings. The only portion of the inner ring which comes in contact with the cylinder is the edge of the flange 4, and this being small in surface, soon wears to an exact fit and permits the spring action of the inner ring to come into full play in forcing an expansion of the outer ring 3 into close contact with the cylinder walls and to compensate for any irregularity therein due to wear.

When the piston ring is arranged in the piston, as arranged in Figs. 5 and 6, it will be manifest that no gas or steam can pass longitudinally between the piston and the cylinder, because it is evident from Fig. 5 that the left-hand edge of the outer ring 3 will shut off any possible passage of gas or steam to the split portion 7 of the inner ring 2; and likewise, it will be seen from Fig. 6 that any passage of steam or gas in the opposite direction would be stopped by the flange 4 of the inner ring fitting up against the split portion 8 of the outer ring. At all other portions of the rings, the passage of the gas or steam is prevented by the full cross sections of both rings (Fig. 4). There is no possible way by which appreciable leakage can be had across the piston ring, and consequently the ring is especially adapted for use in explosive engines and compressors where high compressions are required. It will be observed that the outer ring 3 is normally under little or no strain because it approximately has, normally, the exact diameter of the cylinder, and does not offer objectionable resistance to expansion under the elastic or spring action of the inner ring 2; and because of the elasticity of the outer ring and the small wearing edge of the flange 4 of the inner ring, the piston ring quickly and continually adapts itself to the exact shape of the cylinder and makes a very tight packing. The outer ring being of uniform cross section will remain in any position in which it is put, as no gravity action can tend to make it rotate such as would occur if it were a tapered ring. It is therefore evident that if the ring as a whole were put upon the piston in the position shown in Fig. 1, with the gap 7 of the tapered inner ring at the top, and the split 8 of the outer ring at the bottom, these parts 7 and 8 will remain in those positions, as the greater weight at the part 6 will hold the inner ring with the gap at the top, whereas the general friction of the outer ring will maintain it with the split 8 down or at any other position where it may happen to be placed.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

A piston packing, consisting of an inner ring having a radially shallow circumferential outer groove of uniform cross section, and a normally wide open gap at one place in its circumference, said ring oppositely tapered from a point diametrically opposite the gap whereby it is thickest at said point and tapers gradually on each side thereof to the gap and further having the inner opening eccentric relatively to the outer circumference and the radial width of the opposite faces in tapering form, combined with a relatively thin and very flexible split ring of uniform rectangular cross section fitting the groove of the inner ring and having when under no tension or compression a normal outside diameter approximating the working diameter of the piston ring when compressed in use and relatively much smaller normally than the normal outside diameter of the tapered inner ring, said flexible outer ring in association with the inner ring normally tending to contract and oppose the normal expanding tendency of the inner ring, whereby the outer thin flexible ring in use is neutral as to tension and is expanded solely by the tension of the inner ring.

In testimony of which invention I hereunto set my hand.

LEWIS KINSLEY.

Witnesses:
E. W. SMITH,
FLORENCE DEACON.